United States Patent
Fisher et al.

(10) Patent No.: US 7,614,339 B2
(45) Date of Patent: Nov. 10, 2009

(54) PISTON TOP CHAMFER DESIGN TO REDUCE NOISE AND FRICTION

(75) Inventors: John B. Fisher, Flint, MI (US); Fanghui Shi, Rochester Hills, MI (US); Kenneth E. Schroeder, Sanford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 309 days.

(21) Appl. No.: 11/614,480

(22) Filed: Dec. 21, 2006

(65) Prior Publication Data

US 2008/0148933 A1 Jun. 26, 2008

(51) Int. Cl.
*F01B 31/10* (2006.01)

(52) U.S. Cl. .......................................................... 92/159

(58) Field of Classification Search ...................... 92/159
See application file for complete search history.

(56) References Cited

U.S. PATENT DOCUMENTS

| 1,760,122 A | 5/1930 | Drevitson |
| 6,862,976 B2 * | 3/2005 | Gaiser et al. .................. 92/186 |

FOREIGN PATENT DOCUMENTS

| JP | 2001-336447 A | 12/2001 |
| JP | 2002-174141 A | 6/2002 |
| JP | 2004-353545 A | 12/2004 |

* cited by examiner

Primary Examiner—F. Daniel Lopez

(57) ABSTRACT

Disclosed is a piston having a top chamfer functioning as an oil reservoir, the top chamfer designed to reduce piston noise and friction. The top chamfer partially defines a tapered volume or cavity configured to enhance oil flow to the middle portions of the piston skirt so as to increase lubrication during piston up stroke and thereby reduce piston noise and friction.

10 Claims, 5 Drawing Sheets

US 7,614,339 B2

PISTON TOP CHAMFER DESIGN TO REDUCE NOISE AND FRICTION

TECHNICAL FIELD

The present invention is directed to pistons having a head and skirt portions together with a top chamfer designed to channel oil to the center of the piston skirt to reduce piston noise and friction.

BACKGROUND OF THE INVENTION

As is known in the art, the oil lubrication of pistons in internal combustion engines, such as automotive engines, may be less than optimum in particular situations and under certain engine operating conditions. A lack of optimum levels of lubrication around portions of the piston or skirt periphery can lead to increased piston noise as well as increased friction, in severe cases leading to increased chance of scoring of the piston skin and cylinder liner or wall. Less than optimum lubrication can result in increased piston noise independent of scuffing, scoring and wear issues.

A greater portion of the side stress developed during piston operation is known to occur in regions referred to as the thrust faces. The thrust faces are located on opposing sides of the piston and skirt and aligned perpendicularly to the ends of the piston pin bore. During fuel combustion in the power stroke, side thrust loads become concentrated at the thrust faces. As is known in the art, these high stress regions are subject to greater pressure and frictional force developed against the cylinder wall resulting in increased operating noise and ultimately to greater wear.

SUMMARY OF THE INVENTION

While scuffing and scoring of the piston skirt and the adjacent cylinder wall results in increased noise, increased piston noise can also occur without the presence of scuffing or scoring. When adequate lubrication is provided to the piston and skirt, the piston skirt and cylinder wall are protected against scuffing and scoring. Enhancing this level of lubrication, particularly at the middle portions of the piston skirt advantageously acts to further reduce piston noise. Unlike scuffing and scoring that may occur with the engine operating under significant load, piston noise is more likely to be an issue in low speed, no load or low lead engine operating conditions. The present invention is directed to a piston configured to enhance lubrication to the middle portions of the piston skirt to reduce this piston noise.

The present invention disclosed herein provides an internal combustion engine piston having a top chamfer designed to reduce noise and friction. The piston disclosed herein has a piston head portion and an adjoining skirt portion provided with the novel design tapered top chamfer. The top chamfer is an annular channel about the circumference of the piston configured as a bevel on at least one of its sidewalls. The top chamfer at least partially defines a tapered volume configured to channel oil towards the middle portions or thrust faces of the skirt so as to increase lubrication and thereby reduce piston noise as well as friction and wear. By enlarging the chamfer-defined volume in the middle portion of the skirt proximate to the thrust faces, oil circulation in the circumferential direction is enhanced. The tapered volume defined by the top chamfer increases oil availability to the middle portions of the skirt having the thrust faces at which the piston/liner contact and side thrust forces are concentrated.

One of the major functions of the piston top chamfer is to serve as an oil reservoir. The volume of oil in the top chamfer can account for between twenty to seventy percent of the available oil, depending upon skirt profile and clearance, of the entire volume between the piston skirt and the cylinder bore liner. During the down stroke of the piston, oil enters the piston skirt region in an area between the bottom chamfer of the piston skirt and the cylinder bore liner. While in the down stroke, the oil travels upward along the side of the piston skirt (oil flow being described relative to the motion of the piston and skirt), reaching the top chamfer and filling the top chamfer. Further upward movement of the oil relative to the piston and skirt is effectively inhibited by the wiping action of the oil control ring located above the top chamfer. The oil control ring seals the space between the piston and the cylinder bore wall above the top chamfer, causing oil to accumulate into the top chamfer.

A piston having a top chamfer design to reduce noise and friction according to the present invention includes a head portion having an annular groove formed into the circumference of the head portion. The annular groove is sized and adapted for receiving an oil control ring to inhibit oil migration between the piston and the cylinder bore wall. The piston includes a skirt portion adjoining and attached to the head portion at an upper portion of the skirt portion. The skirt portion includes two opposing middle skirt portions, each having a thrust face, as well as two opposing side skirt portions. The opposing side skirt portions extend between and joinably connect the opposing middle skirt portions. The piston head has a bore therethrough for receiving a piston pin to connect the piston to a crankshaft. The side skirt portions on the piston skirt portion are generally aligned with the opposing ends of the piston pin bore in the piston head portion. As discussed above, the top chamfer is configured to at least partially define a tapered volume or cavity for receiving oil and is formed into the piston in a position adjacent or below the annular groove for the oil control ring. The top chamfer is formed to provide a volume configured to preferentially store and deliver a larger quantity of oil proximate to the middle skirt portion in comparison to the quantity of oil stored proximate to the side skirt portions.

According to one aspect of the invention, the top chamfer is located proximate to the annular groove for the oil control ring.

According to another aspect of the invention, the annular groove is located proximate to said skirt portion.

According to another aspect of the invention, the skirt portion includes a bottom chamfer formed into the circumference of the skirt portion. The bottom chamfer is positioned such that the top chamfer lies between the bottom chamfer and the oil control ring annular groove.

According to another aspect of the invention, the volume defined by the top chamfer is varied along the circumferential wall of the piston by varying the angle at which the chamfer is cut. For example, cutting the chamfer at a shallower angle relative to the circumferential wall of the piston results in a wider top chamfer capable of storing more oil per unit of circumferential length of the top chamfer.

According to another aspect of the invention, the top chamfer is cut into the wall of the annular oil control ring groove, substantially the wall below the oil control ring.

According to another aspect of the invention, the depth of the top chamfer about the circumference of the piston is formed deeper into the piston skin portion at the middle skirt portion relative to the depth of the top chamfer proximate to the side skirt portions so as to preferentially provide for storage of a larger quantity of oil proximate to the middle skirt portion relative to the quantity of oil storable proximate to the side skirt portions.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
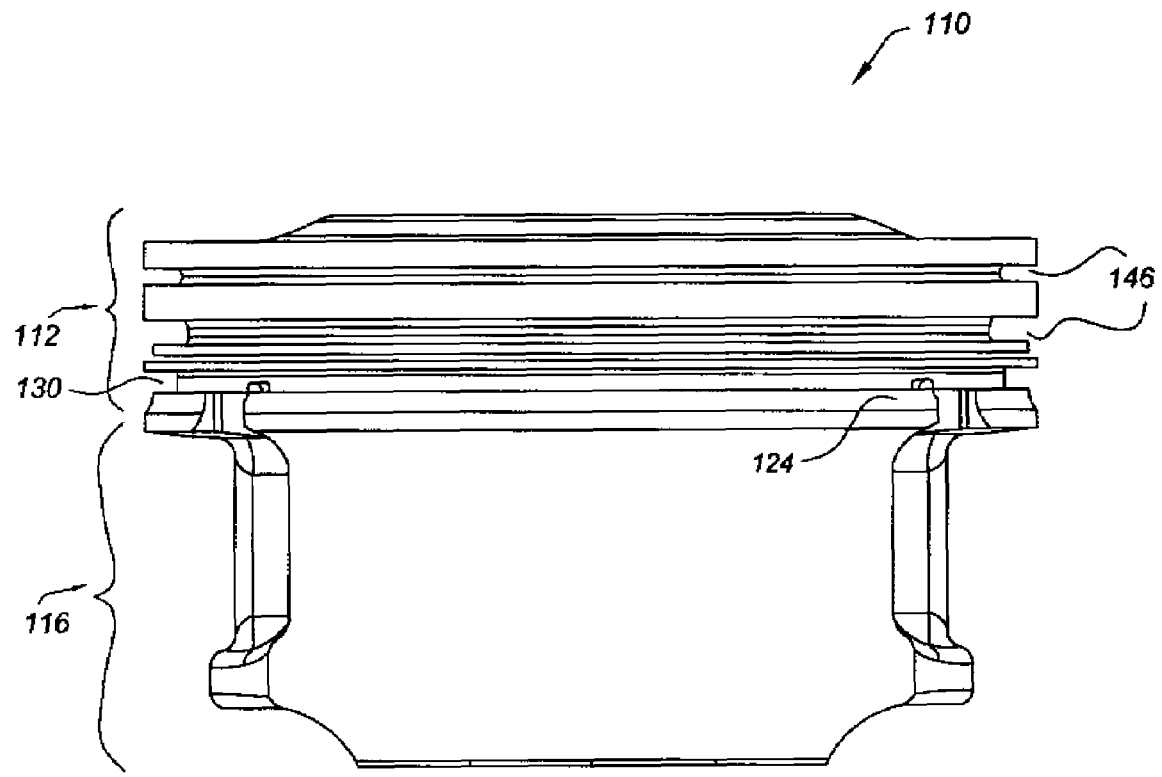
FIG. 1 illustrates a side view of a prior art piston having a piston head portion and skirt portion equipped with a traditional top chamfer design.

FIG. 1 illustrates a side view of a piston 110 having a piston head portion 112 and skirt portion 116 provided with a traditional non-tapered top or axially upper chamfer 124. The piston 110 has an oil control ring groove 130 located above and proximate to the top chamfer 124. The top chamfer 124 and oil control ring groove 130 are located below the piston ring grooves 146.

Figure 2:
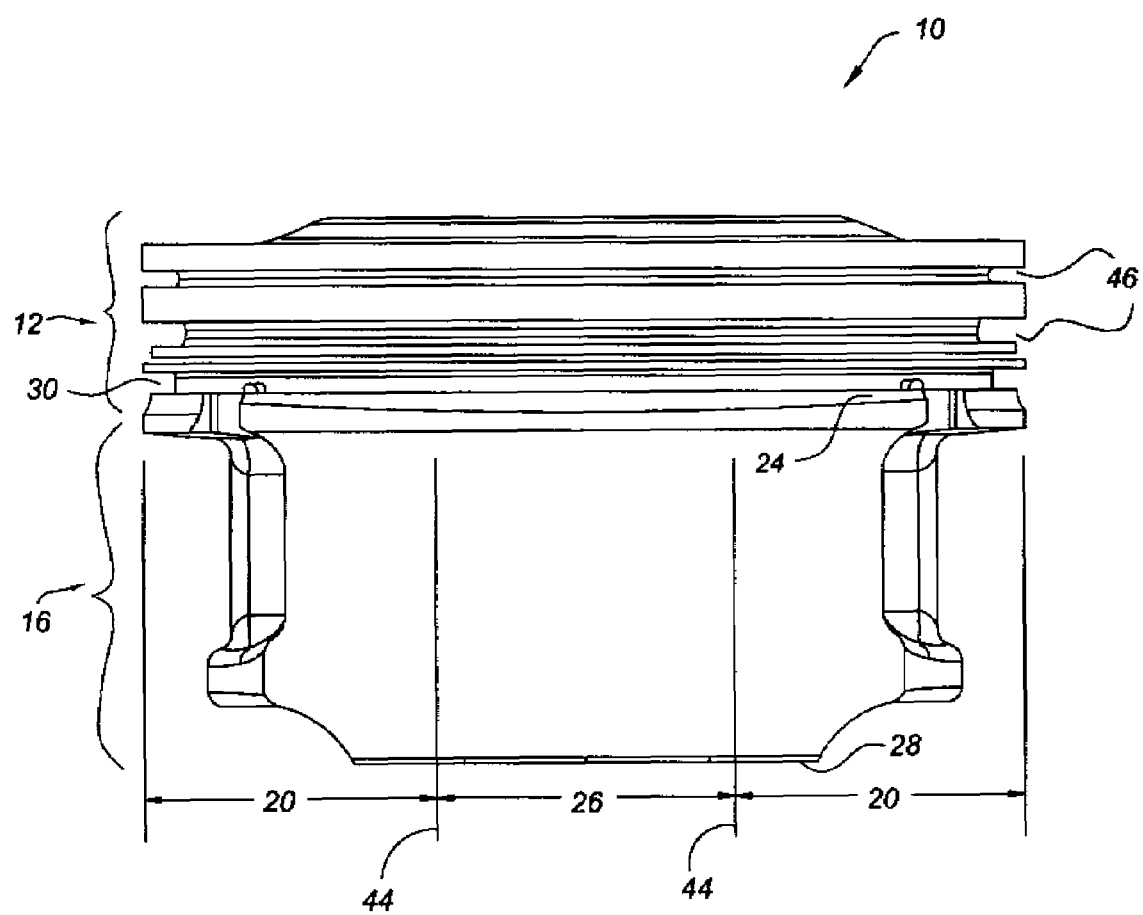
FIG. 2 illustrates a side view of a piston having a piston head portion and skirt portion equipped with a tapered top or upper chamfer design configured to preferentially store and deliver a larger quantity of oil to the middle skirt portion to increase lubrication and thereby reduce piston noise, consistent with the present invention.

FIG. 2 illustrates a side view of a piston 10 having a piston head portion 12 and skirt portion 16 equipped with a top chamfer 24 and a bottom chamfer 28. The top chamfer 24 defines a tapered volume profile configured to preferentially store and deliver a larger quantity of oil to the middle skirt portion 26 (depicted as the region between boundary lines 44) to increase lubrication thereat and thereby reduce piston noise, consistent with the present invention. In FIG. 2, the skirt portion 16 of the piston 10 includes a top chamfer 24 located proximate to and directly below the annular oil control ring groove 30. The top chamfer 24 may be formed as a taper into a portion of the wall of oil control ring groove 30 as shown in FIG. 2, or alternately the top chamfer 24 may be provided as a separate annular groove formed into the skirt 16 directly below the oil control ring groove 30. In another alternate embodiment, the top chamfer 24 may be provided as a separate annular groove formed into the skirt 16 at a spaced location between the oil control ring groove 30 and the bottom chamfer 28. In another embodiment, the top chamfer 24 is a bevel (224 in FIG. 4A) formed onto a top portion of the skirt 16 wherein the top portion of the skirt 16 forms one wall of the annular groove 30 holding the oil control ring (36 of FIG. 3A) with the remaining portions of the oil control ring groove 30 formed into a bottom or lower portion of the piston head portion 12.

When installing the piston 10 into an internal combustion engine (not shown), an oil control ring 36 (shown schematically later in FIG. 3A) is fitted into the oil control ring groove 30 to seal the space between the piston 10 and the cylinder bore wall 32 (shown schematically in FIG. 3A), trapping oil in the top chamfer 24 during a piston 10 down stroke. In FIG. 2, the piston is illustrated with two annular piston ring grooves 46 located above the oil control ring grooves 130, 30 respectively.

The tapered volume forming the top chamfer 24 is configured to channel oil towards the middle skirt portion 26 of the piston skirt 16 to increase lubrication in the middle portion 26 of the skirt 16 and thereby reduce and/or improve piston noise, friction and wear. By reducing the piston top chamfer 24 cross sectional area or volume per unit of circumferential length over the two opposing side skirt portions 20 (reduced volume illustrated by a narrower chamfer width) and enlarging the chamfer volume (volume per unit length or cross sectional area) in the middle skirt portion 26 of the skirt 16 proximate to the thrust faces, then oil circulation in the circumferential direction in the top chamfer 24 is enhanced. As can be understood, the tapered volume top chamfer 24 in FIG. 2 advantageously increases oil availability to the middle skirt portion 26 of the skirt 16 acting to reduce piston noise arising from piston/liner contact occurring with the reciprocating movement of the piston 10 in the cylinder bore wall 32 or liner (shown schematically in FIG. 3A).

Figure 3A:
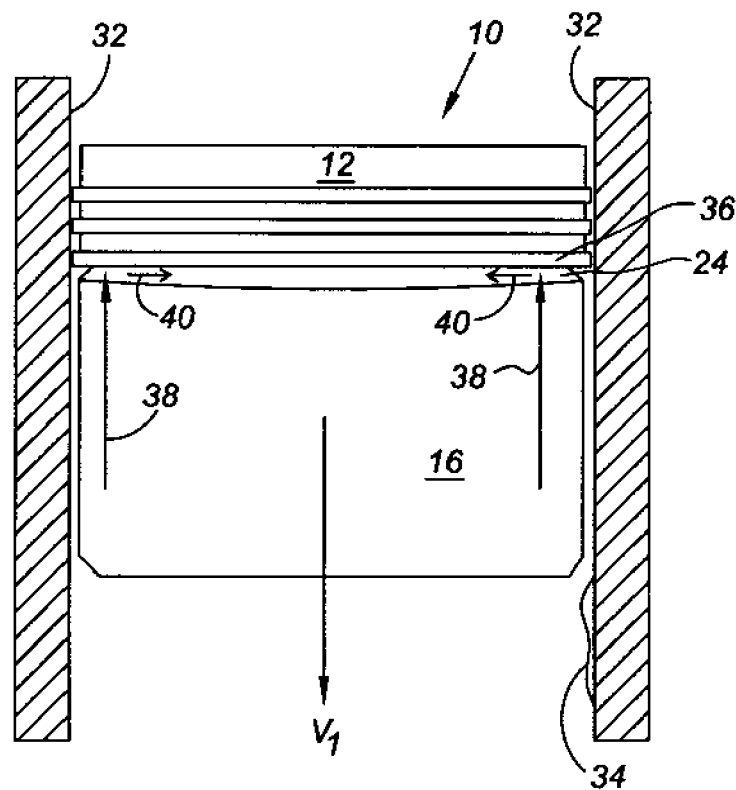
FIG. 3A is a schematic view of a piston in a cylinder bore and having a piston head portion and skirt portion equipped with a tapered top or axially upper chamfer design, illustrating oil flow upwardly along the piston skirt and cylinder wall, thereby filling the top chamfer during a piston down stroke, consistent with the present invention.

FIG. 3A is a schematic view of a piston 10 having a piston head portion 12 and skirt portion 16 equipped with a tapered top chamfer 24, illustrating oil flow upwardly 38 along the piston skirt portion 16 and cylinder bore wall 32 acting to fill the top chamfer 24 during the piston 10 down stroke. As discussed above, one of the major functions of the piston top chamfer 24 is to at least partially serve as an oil reservoir. The volume of oil defined by the top chamfer 24 can account for between twenty to seventy percent of the available oil, depending upon skirt profile and clearance, of the entire volume of the cavity between the piston skirt 16 and the cylinder bore or liner wall 32. FIG. 3A schematically depicts the piston 10 moving downwards relative to the cylinder bore wall 32 at a velocity $V_1$. It is to be understood that the velocity $V_1$ is variable and is used in FIG. 3A solely to indicate the direction of piston travel. An oil film 34 is depicted on only a portion of the cylinder bore wall 32 for convenience and clarity of illustration. It is understood that the oil film 34 coats the major portion of the cylinder wall 32 during engine operation. The oil film 34 travels upward 38 along the side of the piston skirt 16 (oil flow described relative to the motion of the piston and skirt), reaching the top chamfer 24. The oil film 34 on the cylinder bore wall 32 is swept up into the tapered volume top chamfer 24 by the wiping action of the oil control ring 36 against the cylinder wall 32 as the piston to executes a down stroke. As the top chamfer 24 fills, oil flows circumferentially 40 in the top chamfer 24 due to the larger reservoir volume in the middle skirt portion 26 of the top chamfer 24, as discussed earlier.

Figure 3B:
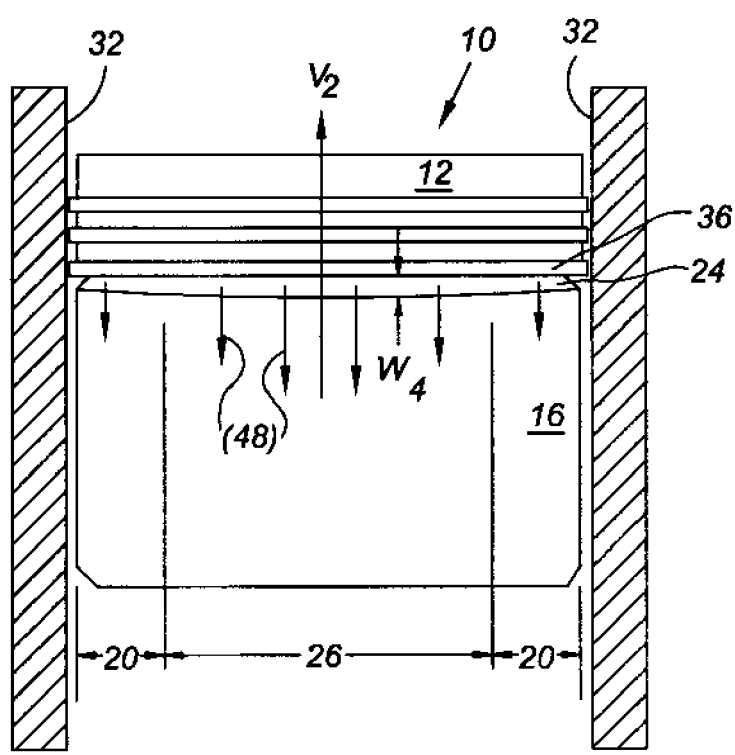
FIG. 3B is a schematic view of the piston of FIG. 3A during an up stroke providing increased lubrication of the middle portions of the piston skirt portion consistent with the present invention.

FIG. 3B is a schematic view of a piston 10 equipped with a piston head portion 12 and skirt portion 16 including a tapered volume top chamfer 24 design. FIG. 3B schematically illustrates the top chamfer 24 providing increased lubrication to the middle skirt portion 26 of the piston skirt 16 during an up stroke, consistent with the present invention. In FIG. 3B, the piston 10 is depicted in an up stroke, traveling upwardly at an instantaneous velocity $V_2$ relative to the cylinder bore wall 32. As in FIG. 3A, the instantaneous velocity vector $V_2$ is shown only to indicate the direction of travel of the piston 10 relative to the cylinder bore wall 32, and not to indicate a particular or uniform velocity. Oil gathered into the top chamfer 24 during the down stroke (shown in FIG. 3A) now flows from the top chamfer 24 on the skirt portion 16 to provide a continuous oil supply lubricating the skirt portion 16 during the up stroke. The top chamfer 24 has a tapered volume (shown by the tapered width of the top chamfer 24) providing increased oil availability (indicated by downward arrows 48) to the middle skirt portion 26. The side skirt portions 20 are generally aligned with the bore (not shown) in the piston 10 that receives a pin (not shown) to hold the piston 10 to the connecting rod (not shown). The middle skirt portions 26 bridge between the side skirt portions 20 on the circumference of the piston skirt 16. The top chamfer 24 is illustrated in FIG. 3B has having a width $W_4$ that increases continuously along the chamfer 24 from the side skirt portions 20 to the middle skirt portion 26.

Figure 3C:
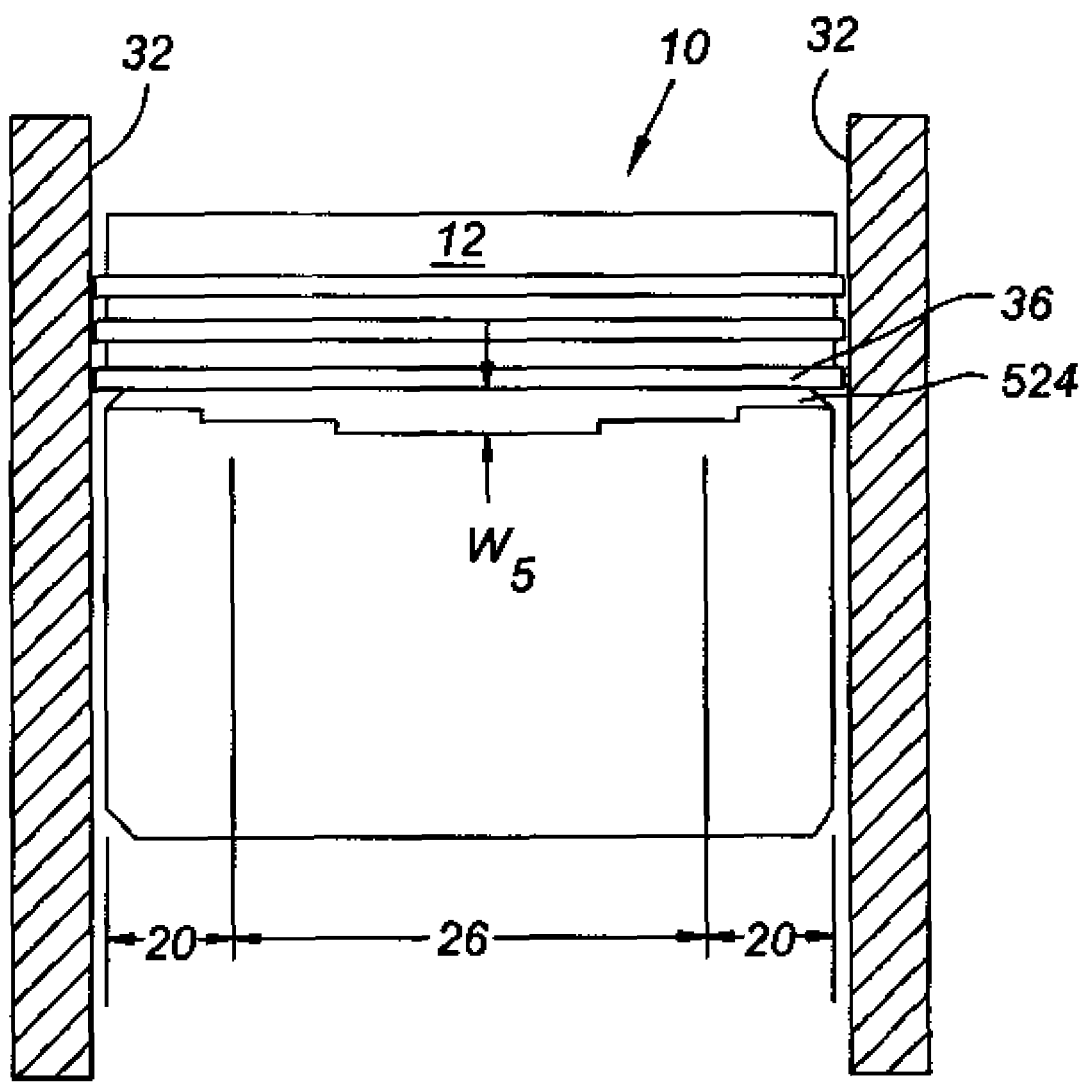
FIG. 3C is a schematic view of a piston having a stepped tapered volume top chamfer consistent with the present invention.

FIG. 3C is a schematic view of a piston 10 equipped with a piston head portion 12 and skirt portion 16 including another embodiment of a tapered volume top chamfer 524 in which the width $W_5$ of the top chamfer 524 increases in steps from the side skirt portions 20 to the middle skirt portion 26.

Figure 4A:
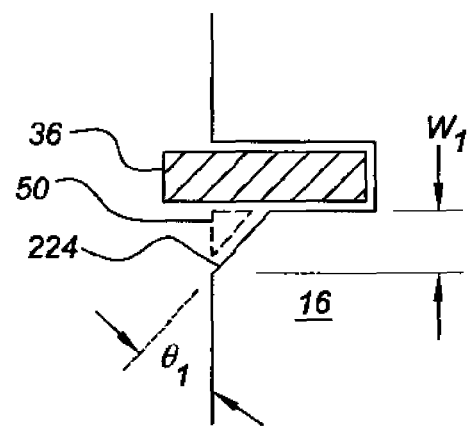
FIGS. 4A, 4B and 4C illustrate various top chamfer configurations formed into a portion of the piston wall at the annular groove for the oil control ring.

FIG. 4A illustrates by way of a fragmentary schematic cross sectional view, a portion of a top chamfer 224 formed into a portion of the lower wall of the annular groove in which the oil control ring 36 is received. The chamfer is formed at an angle $\theta_1$, providing an exemplary cross sectional area 50 indicative of the space for the storage of oil. The top chamfer 224 has a width $W_1$.

Figure 4B:
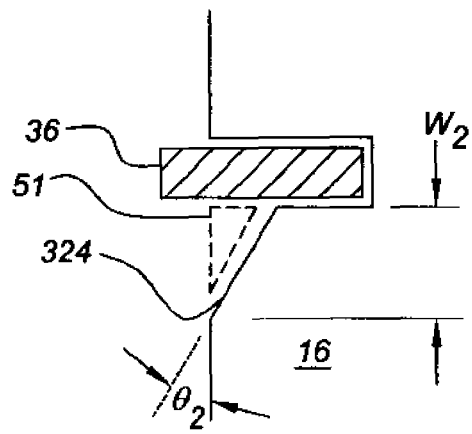

FIG. 4B illustrates by way of a fragmentary schematic cross sectional view, a portion of a top chamfer 324 formed into a portion of the lower wall of the annular groove in which the oil control ring 36 is received. The chamfer is formed at a shallower angle $\theta_2$ relative to the chamfer angle $\theta_1$ illustrated in FIG. 4A. The shallower angle $\theta_2$ provides an increased exemplary cross sectional area 51 indicative of increased space for storing oil relative to the oil storage area 50 of FIG. 4A. The top chamfer 324 has a width $W_2$ which is wider than $W_1$.

Figure 4C:
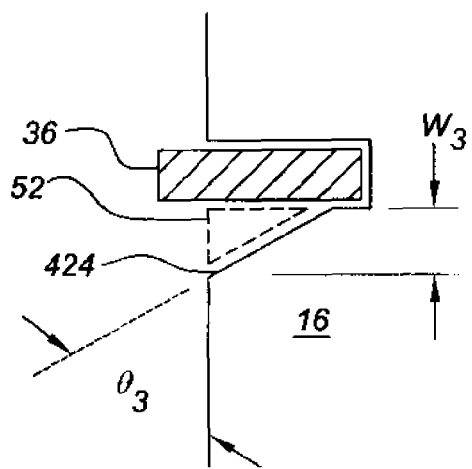

Similarly, FIG. 4C illustrates a top chamfer 424 formed into a portion of the wall of the annular groove for the oil control ring 36. The chamfer is formed at the angle $\theta_3$. As can be seen in comparing FIGS. 4A and 4C, the top chamfer 424 of FIG. 4C provides a larger volume for storing oil (indicated by the larger exemplary cross sectional area 52) due to the greater depth of the top chamfer 324 in FIG. 4C relative to the top chamfer 224 shown in FIG. 4A. The top chamfer 424 has a width $W_3$ equal to the width $W_1$ of top chamfer 224 shown in FIG. 4A. However, the increased volume per unit length of the chamfer in FIG. 4C is the result solely of the increased depth of the chamfer formed at angle $\theta_3$.

It should be understood that the tapered areas 24, 224, 324 and 424 are duplicated on the respective opposite sides of the piston 10.

While the best modes for carrying out the invention have been described in detail, those familiar with the art to which this invention relates will recognize various alternative designs and embodiments for practicing the invention within the scope of the appended claims.

The invention claimed is:

1. A piston comprising:
  a head portion;
  an annular groove formed into the circumference of said head portion, said annular groove sized and adapted for receiving an oil control ring;
  a skirt portion adjoining and attached to said head portion, said skirt portion having thrust faces on opposing sides of the skirt portion; and
  wherein the piston defines an annular chamfer partially forming an annular volume for receiving oil and being formed onto the circumference of the piston;
  wherein the chamfer is formed such that the annular volume is locally enlarged proximate to the thrust faces.

2. The piston according to claim 1, wherein the chamfer is located proximate to said oil control ring annular groove.

3. The piston according to claim 1, wherein the chamfer partially forms the oil control ring annular groove.

4. The piston of claim 1, wherein the chamfer is a bevel formed onto a top portion of said skirt portion, wherein said top portion of said skirt portion forms a wall of said annular groove for said oil control ring.

5. The piston according to claim 1, wherein the depth of said chamfer along the circumference of said piston increases proximate to the thrust faces.

6. The piston according to claim 1, wherein the width of said chamfer increases proximate to the thrust faces.

7. The piston according to claim 1, wherein the annular volume is locally enlarged by varying the angle at which said chamfer is cut into said piston.

8. An engine comprising:
  structure defining a cylinder bore wall;
  a piston having two thrust faces and defining an annular groove and an annular channel; and
  an annular oil control ring fitted within the annular groove and contacting the cylinder bore wall;
  wherein the annular channel is locally enlarged proximate to the thrust faces.

9. The engine according to claim 8, wherein the piston includes a chamfer that at least partially defines the annular channel, and wherein the angle of the chamfer varies.

10. A piston having a circumferential chamfer defining a circumferential groove; wherein the chamfer is characterized by a circumferentially varying chamfer angle to provide a larger volume of oil where needed in the groove for lubrication; wherein the piston defines two thrust faces; and wherein the chamfer angle varies such that the groove is locally enlarged adjacent the two thrust faces.

* * * * *